US005479342A

United States Patent [19]
Sakamoto et al.

[11] Patent Number: 5,479,342
[45] Date of Patent: Dec. 26, 1995

[54] MICROCOMPUTER

[75] Inventors: Hideki Sakamoto; Toshinori Tamura, both of Tokyo, Japan

[73] Assignee: NEC Corporation, Tokyo, Japan

[21] Appl. No.: 296,136

[22] Filed: Aug. 26, 1994

[30] Foreign Application Priority Data

Aug. 31, 1993 [JP] Japan ................................. 5-215616

[51] Int. Cl.⁶ .............................. G06F 9/30; G05B 9/02
[52] U.S. Cl. ............................................ 364/184; 395/375
[58] Field of Search ........................... 364/184; 395/275, 395/375, 575, 725

[56] References Cited

U.S. PATENT DOCUMENTS 4,034,349  7/1977  Monaco et al. ........................ 395/275
4,338,661  7/1982  Tredennick et al. ................... 395/375
4,763,248  8/1988  Kitada .................................... 395/575

Primary Examiner—Paul P. Gordon
Attorney, Agent, or Firm—Whitham, Curtis, Whitham & McGinn

[57] ABSTRACT

An instruction executing unit reads the address of a bug and a corrected program from an external memory through an interface, and stores the bug address and the corrected program in a register and a RAM, respectively. When the execution address of a program reaches the bug address, data of a program counter agree with the data in the register, whereupon a comparator outputs a selection signal to cause a selector to select a branch instruction generator, which supplies a branch instruction to the instruction executing unit. The instruction executing unit executes the branch instruction, thereby causing branching off to the corrected program stored in the RAM and execution of the corrected program.

12 Claims, 9 Drawing Sheets

MICROCOMPUTER

BACKGROUND OF THE INVENTION

1. Field of the Invention

The present invention relates to an information processing apparatus, and more particularly to a microcomputer having at least an instruction executing unit for decoding and executing instructions, a program memory for storing a program, a program counter for successively indicating addresses in the program memory and outputting stored contents, and an interface means for obtaining data from an external source, all integrated on single semiconductor substrate.

2. Description of the Prior Art

Microcomputers comprise a central processing unit (CPU) for carrying out arithmetic and control operations, a program memory, a data memory, and peripherals such as ports and a timer, all integrated in one chip. Microcomputers find use in various applications including electric appliances for home use, and video and audio devices.

The program of a microcomputer is usually stored in a mask ROM which stores program data written at the time the microcomputer is manufactured, and hence the written program cannot be rewritten after the manufacture of the microcomputer.

Microcomputer programs are generated at the time of development of the application devices which are controlled by the microcomputer. Therefore, it is common for a microcomputer program to be generated while the application device is still incomplete. Microcomputer programs are composed of a large volume of data, e.g., 32 kilobytes of data. Consequently, bugs are frequently found in microcomputer programs before and after the corresponding application devices are perfected.

If a microcomputer program bug is found after a microcomputer has been manufactured, the manufactured microcomputer is unusable because the program cannot be corrected by rewriting. Since new electric appliances for home use, for example, are manufactured in quantities of several tens of thousands of units for introduction into the market, a bug in the microcomputer program of a microcomputer costing about five hundred yen can result in a loss of several tens of millions yen. If microcomputers with program bugs have already been installed in application devices, the necessity of discarding the defective application devices results in even greater losses. Even bugs in a microcomputer program can be corrected, the need to reorder and manufacture the microcomputers entails high costs. Inasmuch as application devices cannot be manufactured until microcomputers with a corrected program are available, the sale of the application devices is delayed and the opportunity to sell them is lost.

To eliminate the above problems, Japanese Patent Laid No. 186927/91 discloses a method of rewriting a certain portion of a program for a microcomputer with another program after the microcomputer has been manufactured. The disclosed method employs a nonvolatile memory as an external storage device which is often used in the application of microcomputers. The nonvolatile memory is used to store settings which differ from system to system, such as data for adjusting mechanical variations of application systems, after the application systems have been manufactured. The nonvolatile memory has an empty storage area for storing the address of a bug and a corrected program. When the microcomputer operates in a special mode, the address of the bug and the corrected program are transferred from the nonvolatile memory and stored in a dedicated memory (RAM) in the microcomputer. When the address of the bug is reached, the dedicated memory is selected rather than the internal program memory, thus executing the corrected program. Because the external nonvolatile memory is required irrespective of whether there is a bug or not, any program bugs can be corrected without substantially modifying the application device.

According to the disclosed method, however, since the microcomputer needs to operate in a special mode for the correction of bugs, it is necessary to provide the microcomputer with a dedicated terminal or apply a special signal to change modes for operating the microcomputer in the bug correcting mode. If the dedicated terminal is employed, then the number of function terminals of the microcomputer is reduced, and if the special signal is applied, then an external circuit for generating the special signal is required. Another problem is that the presence of the dedicated terminal or the external circuit gives a clear visible sign of a program bug, indicating that the corrected program is stored in the external nonvolatile memory. As the nonvolatile memory can easily be read and the format in which the corrected program is stored in the nonvolatile memory is available to others as functional specifications of the microcomputer, part of the program can be read by others, possibly resulting in a violation of the copyright or a leakage of classified information. Furthermore, the dedicated memory, which is selected to execute the corrected program rather than a program portion containing a bug, is required to have the same capacity as the program portion containing a bug. In the event that a program bug is large and cannot easily be corrected, limited capacity may allow only the deletion of the program portion containing the bug without capacity to perform other functions. According to the disclosed method, however, such an alternative cannot be chosen, and a program bug cannot be corrected if the capacity of the program portion containing the bug exceeds the capacity of the dedicated memory. If the program contains no bug at all, on the other hand, then the dedicated memory is useless hardware, and the cost effectiveness of the microcomputer is greatly lowered.

SUMMARY OF THE INVENTION

It is therefore an object of the present invention to provide a microcomputer which has function terminals that are not reduced in number, which requires no external circuit, whose program cannot be read by others, which prevents the execution of a program at the address of a bug, and which can execute a program corrected after the manufacture of the microcomputer.

According to an aspect of the present invention, there is provided a microcomputer comprising instruction executing means for decoding and executing instructions, a program memory for storing a program, a program counter for successively indicating addresses in the program memory and making the program memory output stored contents, interface means for obtaining data from an external source, memory means for storing particular address information obtained from the external source through the interface means, comparing means for comparing contents of the memory means with contents of the program counter and outputting a selection signal when the compared contents agree with each other, branch instruction generating means for generating a branch instruction which can be executed by the instruction executing means to change the execution address of the program stored in the program memory, and selecting means for selecting and supplying the branch instruction to the instruction executing means when the selection signal is true and selecting and supplying contents of the program memory to the instruction executing means when the selection signal is false, the instruction executing means comprising means operable according to the program stored in the program memory, for obtaining the particular address information from the external source through the interface means, storing the particular address information in the memory means, and executing the branch instruction to execute a program, which starts from an address different from the particular address information and which is stored in the program memory, when the selection signal is true.

According to another aspect of the present invention, there is also provided a microcomputer comprising instruction executing means for decoding and executing instructions, a program memory for storing a program, a program counter for successively indicating addresses in the program memory and making the program memory output stored contents, interface means for obtaining data from an external source, a plurality of memory means for storing a plurality of items of particular address information obtained from the external source through the interface means, one or a plurality of comparing means for comparing contents of the memory means with contents of the program counter and outputting one or plural detected address signals when the compared contents agree with each other, one or a plurality of branch instruction generating means for generating one or a plurality of branch instructions which can be executed by the instruction executing means to change the execution address of the program stored in the program memory, logic means responsive to the one or plurality of detected address signals for outputting one or a plurality of selection signals, and selecting means for selecting and supplying any of the branch instructions to the instruction executing means when any of the detected address signal is true and selecting and supplying contents of the program memory to the instruction executing means when all the detected address signals are false, the instruction executing means comprising means operable according to the program stored in the program memory for obtaining the particular address information from the external source through the interface means, storing the particular address information in the memory means, and executing the branch instruction to execute a program, which starts from an address different from the particular address information and which is stored in the program memory, when the detected address signal is true.

According to still another aspect of the present invention, there is further provided a microcomputer comprising instruction executing means for decoding and executing instructions, a program memory for storing a program, a program counter for successively indicating addresses in the program memory and making the program memory output stored contents, interface means for obtaining data from an external source, memory means for storing particular address information obtained from the external source through the interface means, comparing means for comparing contents of the memory means with contents of the program counter and outputting a selection signal when the compared contents agree with each other, branch instruction generating means for generating a branch instruction which can be executed by the instruction executing means to change the execution address of the program stored in the program memory, and selecting means for selecting and supplying the branch instruction to the instruction executing means when the selection signal is true and selecting and supplying contents of the program memory to the instruction executing means when the selection signal is false, the program memory comprising, in part or whole, a random-access memory, the branch instruction comprising a branch instruction to branch off to a predetermined address in the random-access memory of the program memory, the instruction executing means comprising means operable according to the program stored in the program memory for obtaining the particular address information from the external source through the interface means, storing the particular address information in the memory means, obtaining a particular program from the external source through the interface means, storing the particular program in an area starting with the predetermined address in the program memory, and executing the branch instruction to execute the particular program, which starts from the predetermined address and which is stored in the program memory, when the selection signal is true.

According to yet another aspect of the present invention, there is also provided a microcomputer comprising instruction executing means for decoding and executing instructions, a program memory for storing a program, a program counter for successively indicating addresses in the program memory and making the program memory output stored contents, interface means for obtaining data from an external source, a plurality of memory means for storing a plurality of items of particular address information obtained from the external source through the interface means, one or a plurality of comparing means for comparing contents of the memory means with contents of the program counter and outputting one or a plurality of detected address signals when the compared contents agree with each other, one or a plurality of branch instruction generating means for generating one or a plurality of branch instructions which can be executed by the instruction executing means to change the execution address of the program stored in the program memory, logic means responsive to the one or plurality of detected address signals for outputting one or a plurality of selection signals and selecting means for selecting and supplying any of the branch instructions to the instruction executing means when any of the detected address signal is true, and selecting and supplying contents of the program memory to the instruction executing means when all of the detected address signals are false, the program memory comprising, in part or whole, a random-access memory, the branch instruction comprising a branch instruction to branch off to a predetermined address in the random-access memory of the program memory, the instruction executing means comprising means operable according to the program stored in the program memory for obtaining the particular address information from the external source through the interface means, storing the particular address information in the memory means, obtaining a particular program from the external source through the interface means, storing the particular program in an area starting with the predetermined address in the program memory, and executing the branch instruction to execute the particular program, which starts from the predetermined address and which is stored in the program memory, when the detected address signal is true.

The above and other objects, features, and advantages of the present invention will become apparent from the following description by referring to the accompanying drawings which illustrate examples of the present invention.

DETAILED DESCRIPTION OF THE PREFERRED EMBODIMENTS

Figure 1:
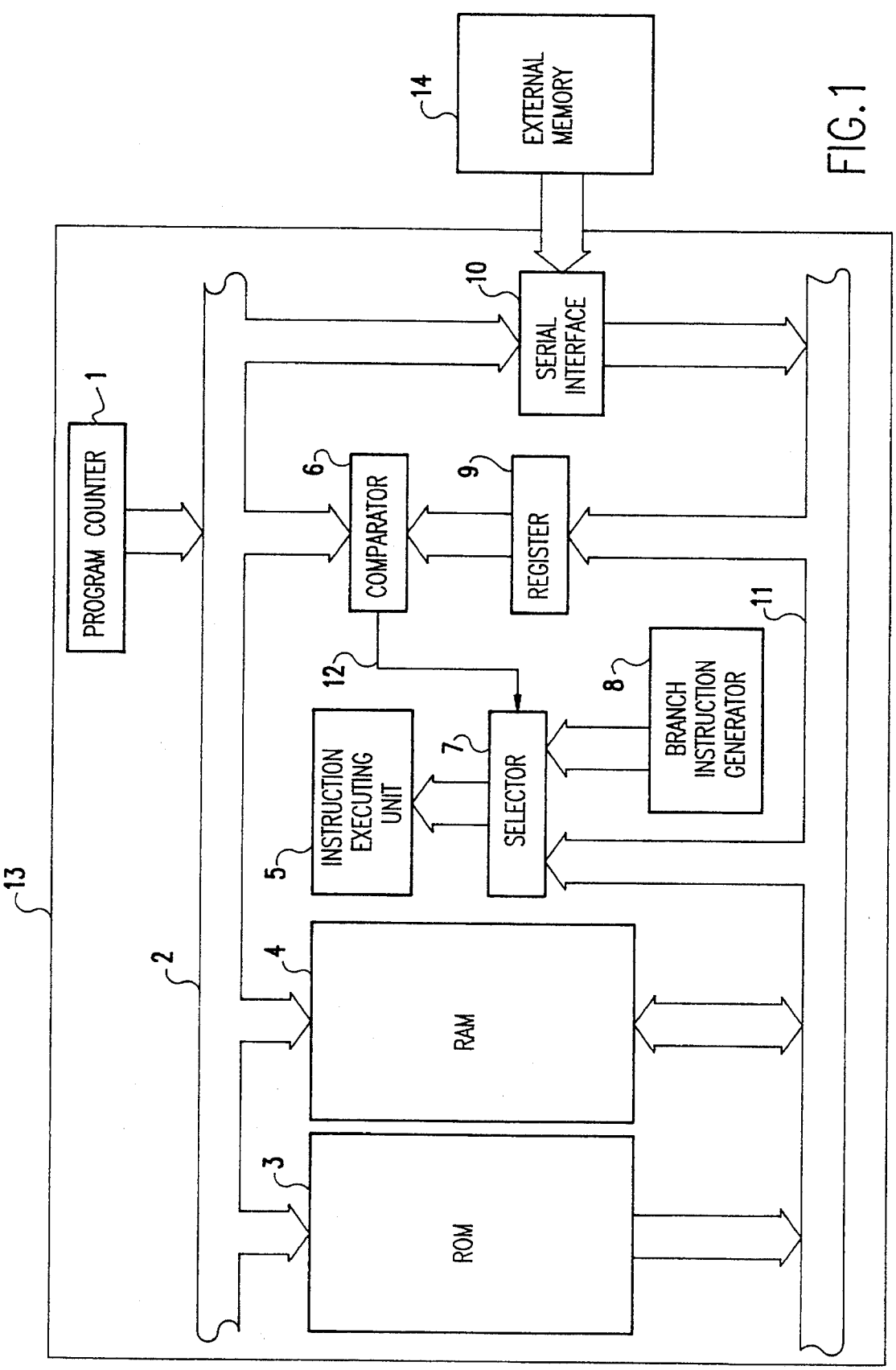
FIG. 1 is a block diagram of a microcomputer according to a first embodiment of the present invention.

First Embodiment:

As shown in FIG. 1, a microcomputer 13 according to a first embodiment of the present invention comprises a program counter 1, an address bus 2, a read-only memory (ROM) 3, a random-access memory (RAM) 4, an instruction executing unit 5, a comparator 6, a selector 7, a branch instruction generator 8, a register 9, a serial interface 10, and a data bus 11.

The program counter 1 comprises a 16-bit counter for successively indicating addresses where instructions to be executed by the instruction executing unit 5 are stored. The program counter 1 outputs addresses to the address bus 2. The address bus 2 comprises a 16-bit bus for transmitting the addresses. The ROM 3 is supplied with addresses from the address bus 2, and outputs data to the data bus 11. The ROM 3 is in a memory space ranging from addresses 0000H to BFFFH (H indicates a hexadecimal notation). The RAM 4 is also supplied with addresses from the address bus 2, and exchanges data with the data bus 11. The RAM 4 is in a memory space ranging from addresses F400H to F7FFH. Each of the ROM 3 and the RAM 4 may be used as a program memory or a data memory.

The instruction executing unit 5 is a block for decoding and executing instructions, and controls the blocks in the microcomputer 13. The comparator 6 (comparing means) is supplied with the contents of the program counter 1 through the address bus 2 and the contents of the register 9 (memory means), and compares them. If the compared data agree with each other, then the comparator 6 outputs a high-level selection signal 12. If the compared data do not agree with each other, then the comparator 6 outputs a low-level selection signal 12. The selector 7 (selecting means) selects an output signal from the branch instruction generator 8 when the selection signal 12 is of a high level, and selects data on the data bus 11 when the selection signal 12 is of a low level. The selector 7 outputs the selected signal or data to the instruction executing unit 5. The branch instruction generator 8 (branch instruction generating means) generates an instruction code of an absolute branch instruction "BR !F7FDH" (indicating branching to an address F7FDH). The register 9 comprises a 16-bit register for storing a certain address where the execution of the program is to be avoided.

The serial interface 10 (interface means) reads the contents of an external memory 14 connected to the microcomputer 13 into the microcomputer 13, and outputs them to the data bus 11. The data bus 11 comprises an 8-bit data bus. The selection signal 12 is a signal indicative of whether the contents of the program counter 1 and the register 9 agree with each other or not. When the selection signal 12 is high, it indicates that the contents of the program counter 1 and the register 9 agree with each other. When the selection signal 12 is low, it indicates that the contents of the program counter 1 and the register 9 do not agree with each other. The memory 14 comprises a nonvolatile memory with a built-in serial interface, and can read the stored data as serial data. Heretofore, the memory 14 stored data which may be changed after the microcomputer 13 is manufactured, such as adjustment data of an application device in which the microcomputer 13 is incorporated. According to the present invention, the memory 14 stores such data, and in addition, stores the address of a bug in the program and a corrected program.

Figure 4:
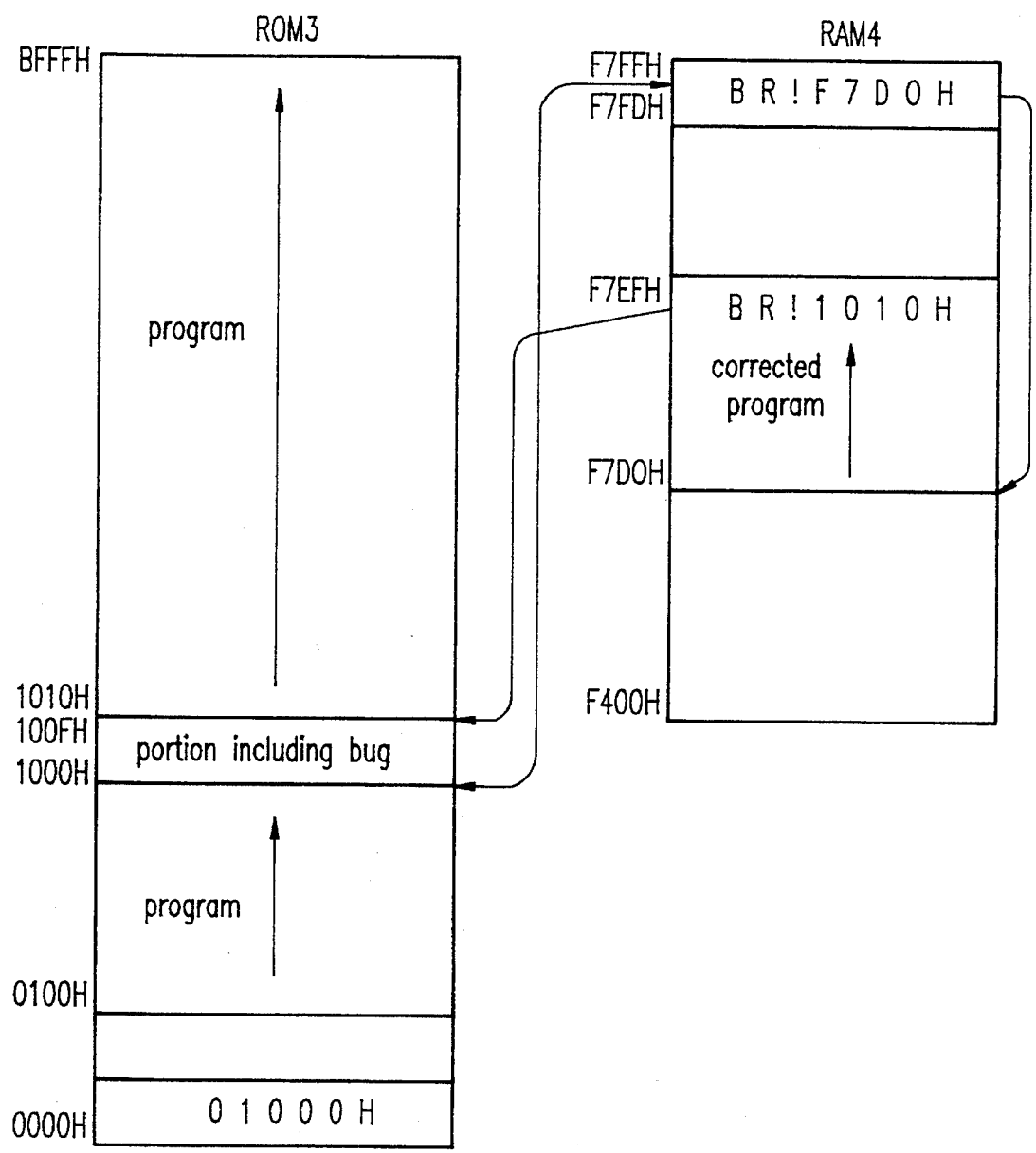
FIG. 4 is a diagram showing memory maps of a ROM and a RAM of the microcomputer according to the first embodiment and a program sequence.

Operation of the microcomputer 13 will be described below. The program of the microcomputer 13 is stored in the ROM 3. It is assumed that the program contains a bug, and such a bug is to be avoided. As shown in FIG. 4, the program ranges from addresses 0100H to BFFFH, and a bug is contained in a program portion ranging from addresses 1000H to 100FH.

When the microcomputer 13 is reset, it refers to a vector table 0100H at the address 0000H in the ROM 3, stores the vector table 0100H in the program counter 1, and starts executing the program from the address 0100H. The program contains, at its start, a program for initializing the various portions of the microcomputer 13. Since such a program is of importance in the present invention, it will be described in detail below.

At the time the program is developed, it cannot be predicted whether a bug will be produced or not, and the address of a bug and its contents cannot be determined. In order to avoid and correct a bug at the time it is found, the program contains, at its start, a decision routine for determining whether the bus is to be avoided and corrected. Thus, in the absence of any bug, no process of avoiding and correcting a bug is carried out, and in the event of a bug, a process of avoiding and correcting the bug is carried out.

Figure 2:
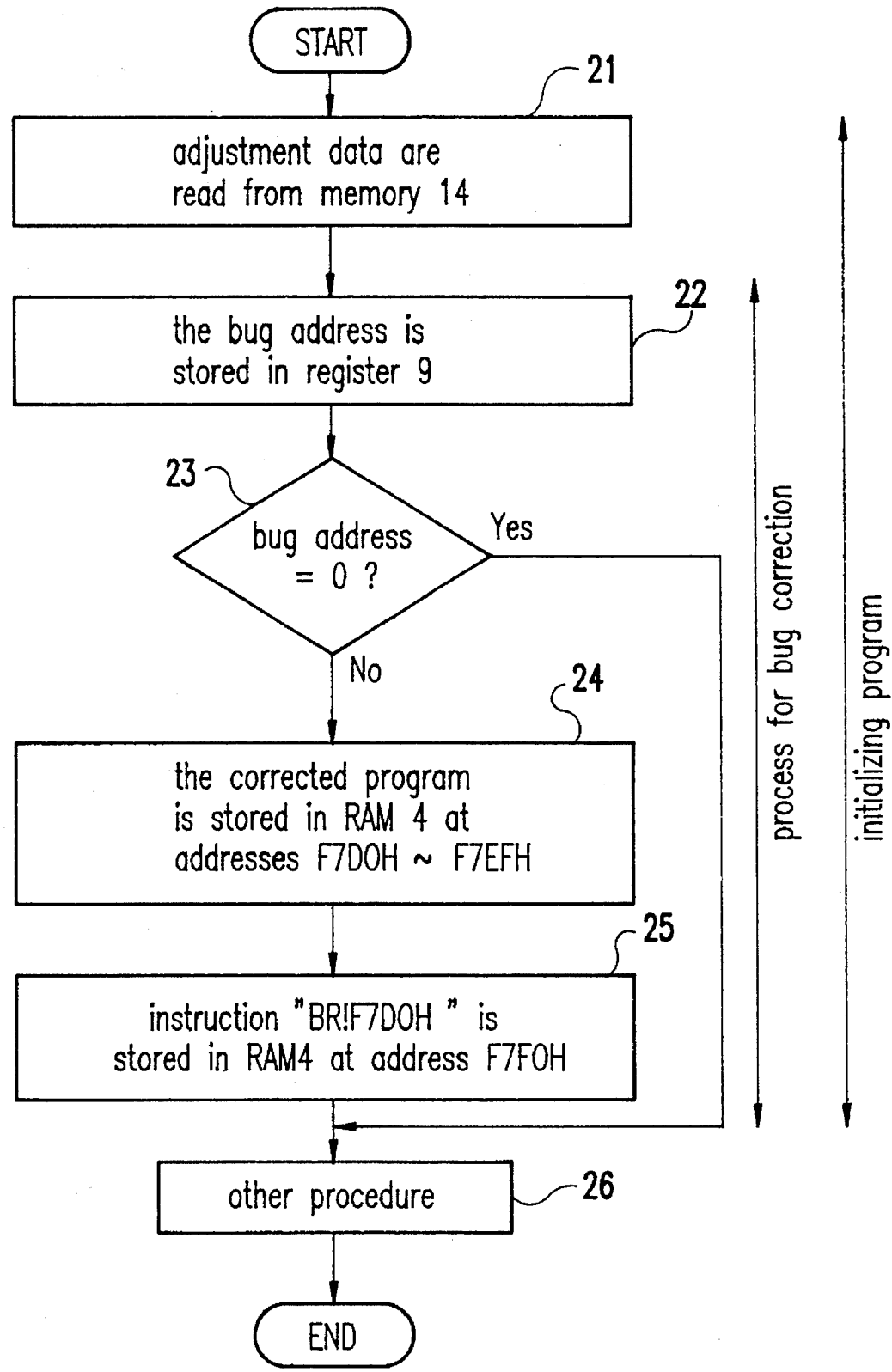
FIG. 2 is a flowchart of a program for the microcomputer according to the first embodiment.

FIG. 2 shows an initializing program to be executed by the microcomputer 13. In the initializing program, various adjustment data are read from the memory 14 in a step 21. In a conventional microcomputer, only data which may be varied after the microcomputer has been manufactured, e.g., adjustment data, are read. According to the present invention, such adjustment data as well as the address of a bug in the program and a corrected program are read from the memory 14 in step 21. The read data are supplied through the serial interface 10 to the data bus 11, and stored in the RAM 4 and the register 9 by the instruction executing unit 5 according to the program in a step 22. The instruction executing unit 5 reads bug address information, and if the bug address information is 0 in a step 23, then the instruction executing unit 5 skips subsequent steps of the initializing program, and the process shown in FIG. 2 is finished. If there is a bug, and hence the bug address information is not 0, then the instruction executing unit 5 writes the bug address in the register 9, reads the corrected program from the memory 14, and writes the corrected program in the RAM 4 at its addresses F7D0H~F7EFH in a step 24. In this embodiment, when the address set in the register 9 is reached, the program is branched to an address F7FDH. Therefore, the instruction executing unit 5 writes, in the address F7FDH of the RAM 4, an instruction "BR !F7D0H" indicating the branching to an address F7D0H as the starting address of the corrected program in a step 25.

Figure 3:
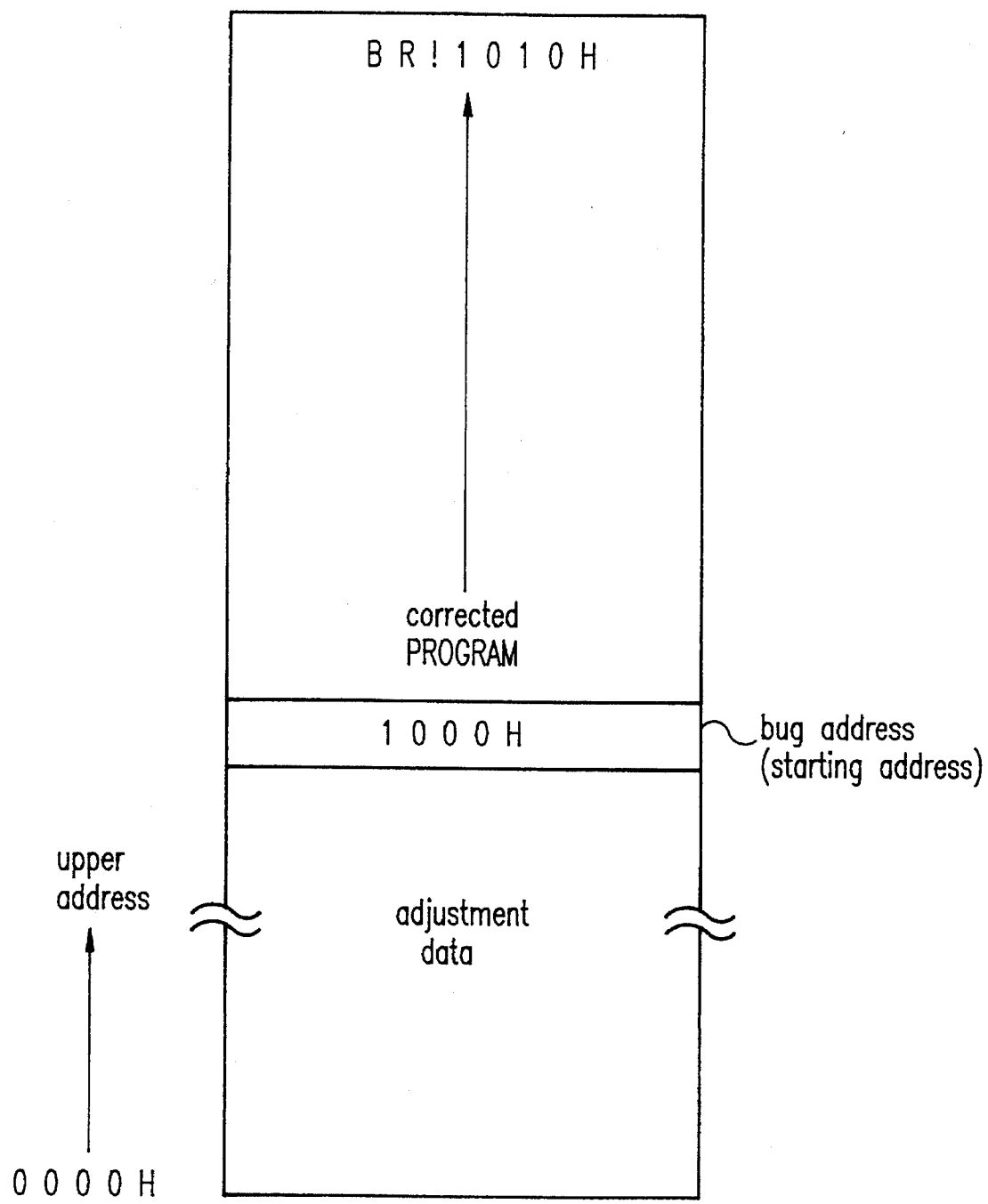
FIG. 3 is a diagram showing the contents of an external memory connected to the microcomputer according to the first embodiment.

FIG. 3 shows the contents of the memory 14 by way of example. If the program contains no bug, the bug address information is 0 and the area for storing a corrected program may be empty. If the program contains a bug in the addresses 1000H–100FH, then the starting address 1000H of the bug is stored as bug address information and the corrected program is stored in the memory 14. The ending address of the corrected program stores an instruction "BR !1010H" indicating the branching to an address 1010H next to the bug, i.e., next to the address 100FH. In this manner, the bug is avoided and the corrected program is executed. Thereafter, the program following the bug is executed in a step 26.

After the initializing program, the microcomputer 13 operates in the same manner as the conventional microcomputer until the execution address of the program reaches the address 1000H where the bug exists. Specifically, the program counter 1 successively outputs addresses to the address bus 2, and the ROM 3 outputs instructions to the data bus 11. The instruction executing unit 5 reads instructions from the data bus 11 through the selector 7, and executes the instructions thereby to execute the program. At the time the instruction executing unit 5 reads instructions, it outputs the contents of the program counter 1 to the address bus 2. Since the contents of the register 9 is 1000H, the selection signal remains low until the address 1000H is reached. Therefore, the selector 7 selects the data on the data bus 11, and the instruction executing unit 5 executes the program stored in the ROM 3.

Figure 5:
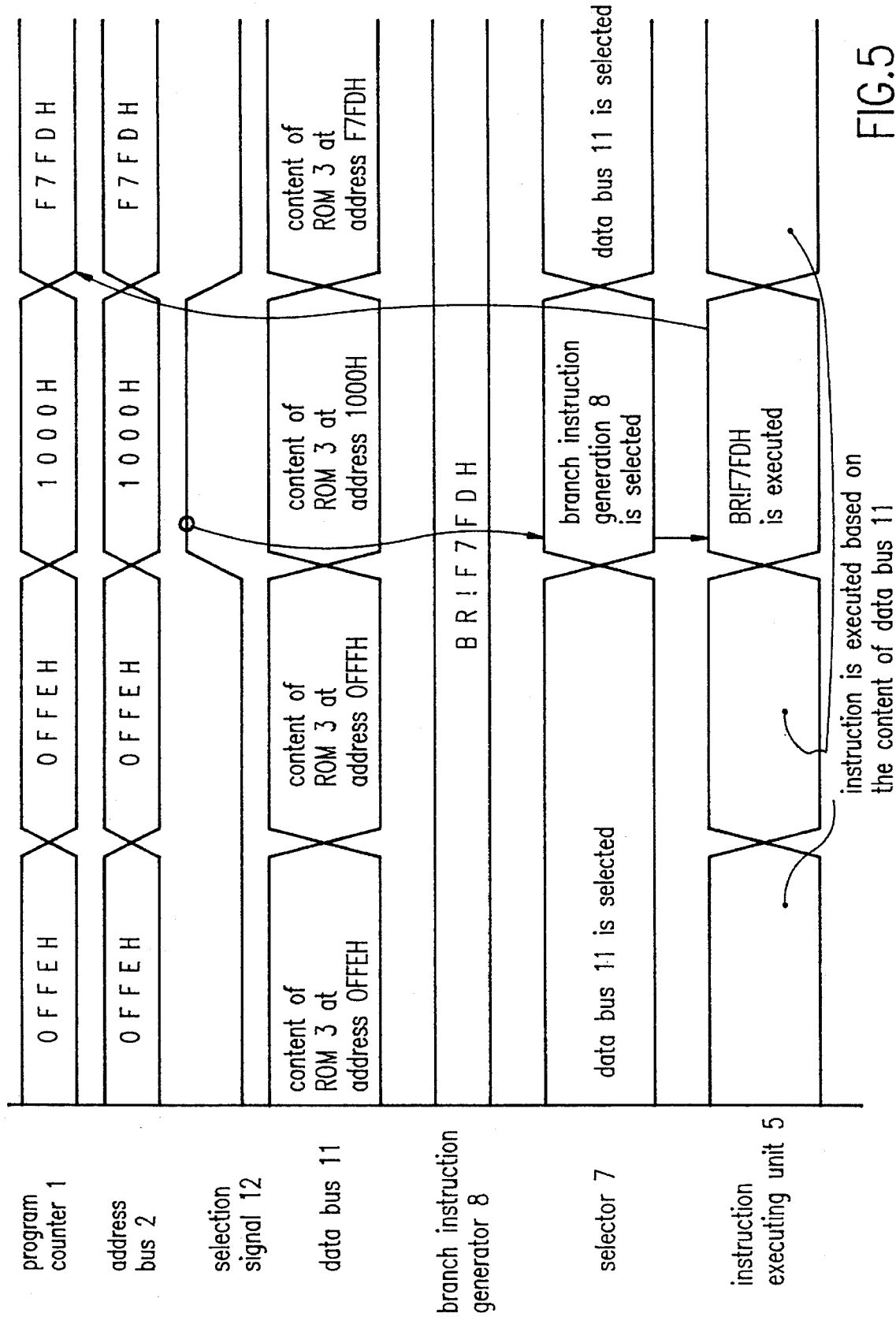
FIG. 5 is a timing chart of the operation of various components of the microcomputer according to the first embodiment.

Operation of the microcomputer 13 when the execution address of the program reaches the address 1000H will be described below. FIG. 5 is a timing chart of operation of various components of the microcomputer 13 at the time the execution address is in the vicinity of 1000H. When the program counter 1 counts up to 1000H and outputs 1000H to the address bus 2, the comparator 6 detects the agreement between the address on the address bus 2 and the address stored in the register 9, and outputs a high-level selection signal 12. Since the selector 7 selects an output signal from the branch instruction generator 8, the instruction executing unit 5 does not read the contents of the address 1000H in the ROM 3, but reads the absolute branch instruction "BR !F7FDH". Therefore, the program is branched to the address F7FDH. At this time, the contents of the program counter 1 are F7FDH, which is different from the contents 1000H of the register 9. Therefore, the selection signal 12 becomes low, and the selector 7 selects data on the data bus 11. The instruction executing unit 5 reads the contents of the address F7FDH in the RAM 4 through the data bus 11. As the address F7FDH in the RAM 4 stores an instruction code "BR !F7D0H", the instruction executing unit 5 executes this instruction code, and branches off to the address F7D0H in the RAM 4. The instruction executing unit 5 now executes the corrected program stored following the address F7D0H. After the final address "BR !1010H" of the corrected program, the instruction executing unit 5 branches off to the address 1010H in the ROM 3, and executes the subsequent program.

FIG. 4 shows a sequence of the program in the memory maps of the ROM 3 and the RAM 4. The program is executed in the directions indicated by the arrows. As shown in FIG. 4, the execution of the program portion ranging from the addresses 1000H to 100FH in the ROM 3 is avoided, and, instead, the corrected program stored in the RAM 4 is executed. Consequently, a program bug can be corrected, and the microcomputer is controlled to operate as desired. Since the address of a bug to be corrected and a corrected program are stored in the external memory 14, the program bug can be corrected after the microcomputer 13 has been manufactured.

In the above embodiment, as described above, after the microcomputer 13 has been manufactured, the execution of an address where a program bug exists can be avoided and a corrected program can be executed. Since the microcomputer 13 is not required to operate in a special mode, a special terminal and an external circuit for such a special mode are not necessary. It is not necessary to reduce the number of function terminals of the microcomputer 13, and the cost and package area of the microcomputer are not increased as no external circuit is employed. It is impossible to predict the existence of a program bug simply based on the external memory 14 connected to the microcomputer 13. The corrected program is stored in the memory 14 in a desired format depending on the program stored in the ROM 3, and it is not possible for others to read and obtain the corrected program from the memory 14. Consequently, there is no danger of a violation of the copyright of the program or a leakage of confidential information. As the corrected program is stored in the RAM 4, no dedicated memory for storing the corrected program is required. The corrected program is only required to store "BR !1010H" at its final address, and its capacity is not required to be the same as the capacity of the program portion containing a bug. Therefore, even if a program bug is large, it can be avoided without consuming a large area of the RAM 4 provided the program bug is to be simply avoided.

In the above embodiment, the branch instruction generator 8 generates the instruction code of the absolute branch instruction "BR !F7FDH". However, when the address of a bug is reached, the instruction executing unit 5 may always branch off to the starting address "0100H" of the program, and the branch instruction generator 8 may generate a branch instruction "BR !0100H". With such an arrangement, when the address of a bug is reached, the program portion containing the bug is not executed, and the microcomputer 13 is initialized all over again. In this case, the memory 14 is required to store only the bug address 1000H and not a corrected program. Since no corrected program is stored in the memory 14, the storage area of the RAM 4 is not unduly consumed.

Second Embodiment:

In the first embodiment, the register 9 stores 0 if the program contains no bug and does not need to be corrected, and, since the address 0000H is a vector table area to be referred to when the microcomputer 13 is reset and hence is not executed as a program, the selection signal 12 is prevented from going high by storing 0 in the register 9. However, if the data stored in the register 9 are rewritten into 2000 H due to a program runaway, then the comparator 6 produces a high-level selection signal 12 each time the program reaches the address 2000H, and the instruction executing unit 5 executes a branch instruction. When this happens, since the program contains no bug, no corrected program is stored in the RAM 4, and hence, the microcomputer suffers a program runaway. When a program runaway occurs to the extent that it rewrites the register 9, even if the microcomputer recovers from such a program runaway, the microcomputer will undergo a program runaway again when it executes a certain address in the program.

Figure 6:
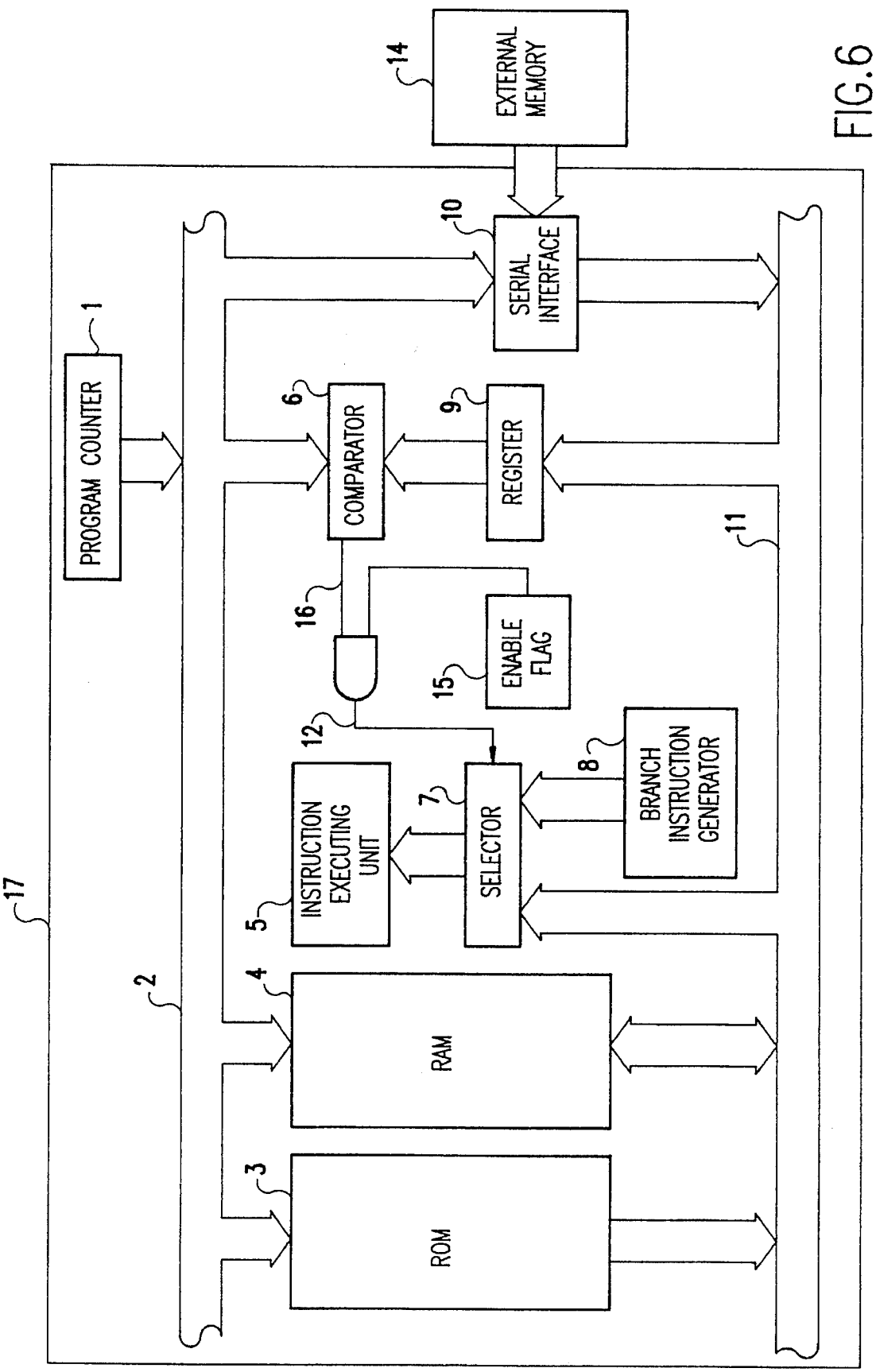
FIG. 6 is a block diagram of a microcomputer according to a second embodiment of the present invention.

In order to prevent the above problem from arising, a microcomputer 17 according to a second embodiment shown in FIG. 6 has an enable flag 15 added to make the result of comparison by the comparator 6 invalid and render the selection signal 12 low at all times. Those parts shown in FIG. 6 which are identical to those shown in FIG. 1 are denoted by identical reference numerals.

The enable flag 15 is held high or low in level and outputted under the control of the instruction executing unit 5. The instruction executing unit 5 is a block decoding and executing instructions, and controls the blocks in the microcomputer 17. The microcomputer 17 has dedicated instructions "SET ENFLG" and "CLR ENFLG" for setting the enable flag 15 to different values or levels. Specifically, the enable flag 15 is set to a high level by the instruction "SET ENFLG", and to a low level by the instruction "CLR ENFLG". A detected address signal 16 is a signal indicative of whether the contents of the program counter 1 and the register 9 agree with each other or not. When the detected address signal 16 is high in level, it indicates that the contents of the program counter 1 and the register 9 agree with each other. When the detected address signal 16 is low in level, it indicates that the contents of the program counter 1 and the register 9 do not agree with each other. A selection signal 12 is produced by ANDing the detected address signal 16 and the enable flag 15. When the selection signal 12 is of a high level, the selector 7 selects an output signal from the branch instruction generator 8 and outputs the signal to the instruction executing unit 5. When the selection signal 12 is of a low level, the selector 7 selects data on the data bus 11 and outputs the data to the instruction executing unit 5.

Operation of the microcomputer 17 shown in FIG. 6 will be described below with reference to FIG. 7.

Figure 7:
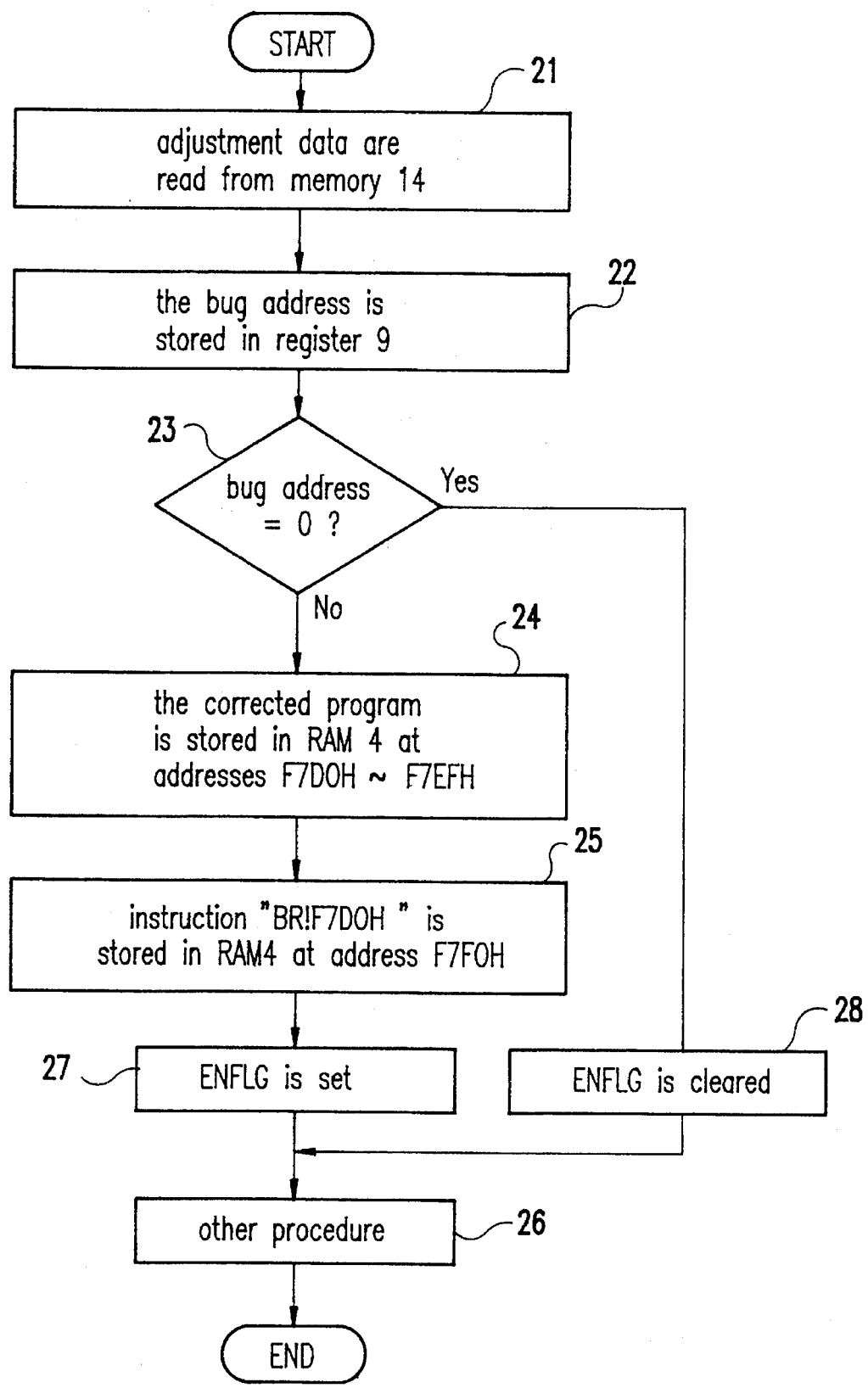
FIG. 7 is a flowchart of a program for the microcomputer according to the second embodiment.

FIG. 7 shows a program for the microcomputer 17 according to the second embodiment. The program shown in FIG. 7 differs from the program shown in FIG. 2 with respect to a portion of the initializing program. Specifically, the program shown in FIG. 7 includes steps 27, 28 enclosed by thicker lines, which are different from the program shown in FIG. 2, and other steps identical to those of the program shown in FIG. 2.

The contents of the memory 14 and the memory maps of the ROM 3 and the RAM 4 are the same as those according to the first embodiment shown in FIGS. 3 and 4.

In the event that the program contains a bug, a corrected program and a branch instruction are stored in the RAM 4 in steps 24, 25, and the enable flag 15 is set to a high level by the instruction "SET ENFLG" in a step 27. Since the selection signal 12 is of the same logic level as the detected address signal 16, the subsequent operation is the same as in the first embodiment. Specifically, when the execution address of the program reaches the address 1000H where the bug exists, the comparator 7 selects an output signal from the branch instruction generator 8. Therefore, the instruction executing unit 5 executes the corrected program stored in the RAM 4. If the program contains no bug, then the enable flag 15 is set to a low level by the instruction "CLR ENFLG" in a step 28. Therefore, the selection signal 12 is kept at a low level at all times irrespective of the detected address signal 16. The selector 7 thus selects data on the data bus 11, and the instruction executing unit 5 executes the program stored in the ROM 3. Even if the contents of the register 9 are rewritten due to a program runaway, the branch instruction generator 8 is prevented from being selected and branching off to the RAM 4.

According to the second embodiment, as with the first embodiment, after the microcomputer 17 has been manufactured, a bug in the program stored in the ROM 3 can be avoided and a corrected program can be executed. The number of function terminals of the microcomputer 17 is prevented from being reduced, and an external circuit does not need to be employed. The copyright of the program is protected, and the confidential information is maintained against leakage. Furthermore, the microcomputer 17 according to the second embodiment can avoid the drawback of the first embodiment that a program runaway always occurs at a certain address in the event that the register 9 is rewritten.

Figure 8:
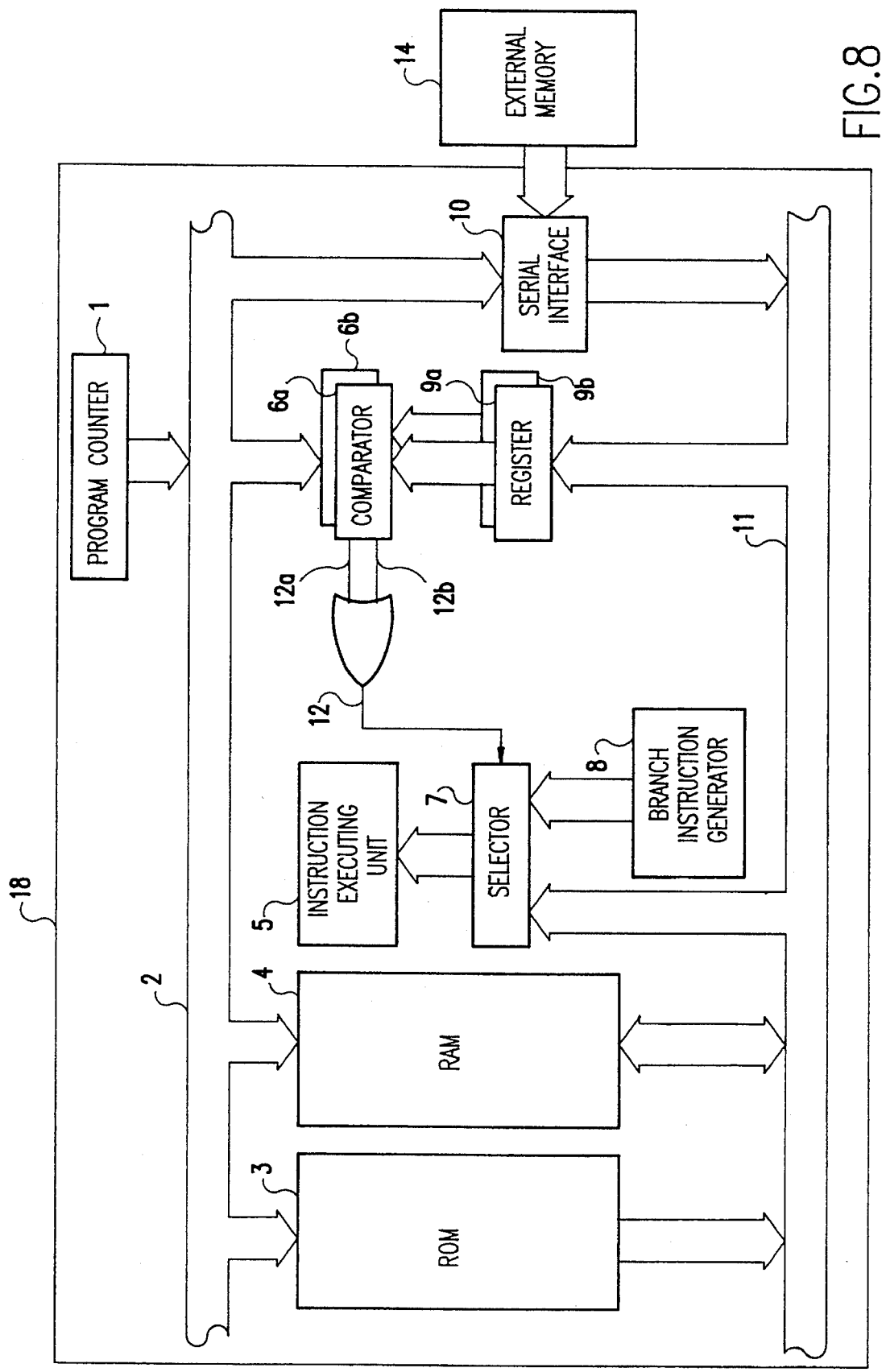
FIG. 8 is a block diagram of a microcomputer according to a third embodiment of the present invention.

Third Embodiment:

According to a third embodiment shown in FIG. 8, a microcomputer 18 is capable of correcting a plurality of bugs contained in the program which is executed by the microcomputer 18. To correct a plurality of program bugs, the microcomputer 18 has two comparators 6a, 6b and two registers 9a, 9b. Other details of the microcomputer 18 are essentially the same as those of the microcomputer 13 according to the first embodiment.

The registers 9a, 9b serve to store starting addresses of portions of the program which are to be modified. The comparators 6a, 6b compare the contents of the registers 9a, 9b with the contents of the program counter 1. If the compared data agree with each other, then the comparators 6a, 6b output high-level detected address signals 12a, 12b, respectively. If the compared data do not agree with each other, then the comparators 6a, 6b output low-level detected address signals 12a, 12b, respectively. A selection signal 12 is produced by ORing the detected address signals 12a, 12b. The microcomputer 18 operates in substantially the same manner as the microcomputer 13 according to the first embodiment, but can set the addresses of two bugs as it has two registers and two comparators. For example, if an address 1000H is set in register 9a and an address 2000H is set in register 9b, then when the execution address of the program reaches 1000H and 2000H, the selector 7 selects an output signal from the branch instruction generator 8, and the instruction executing unit 5 branches off to the RAM 4. Accordingly, the microcomputer 18 can correct two bugs contained in the program. If two program bugs are to be corrected in different fashions, then the conditional branches may be carried out in corrected programs.

Figure 9:
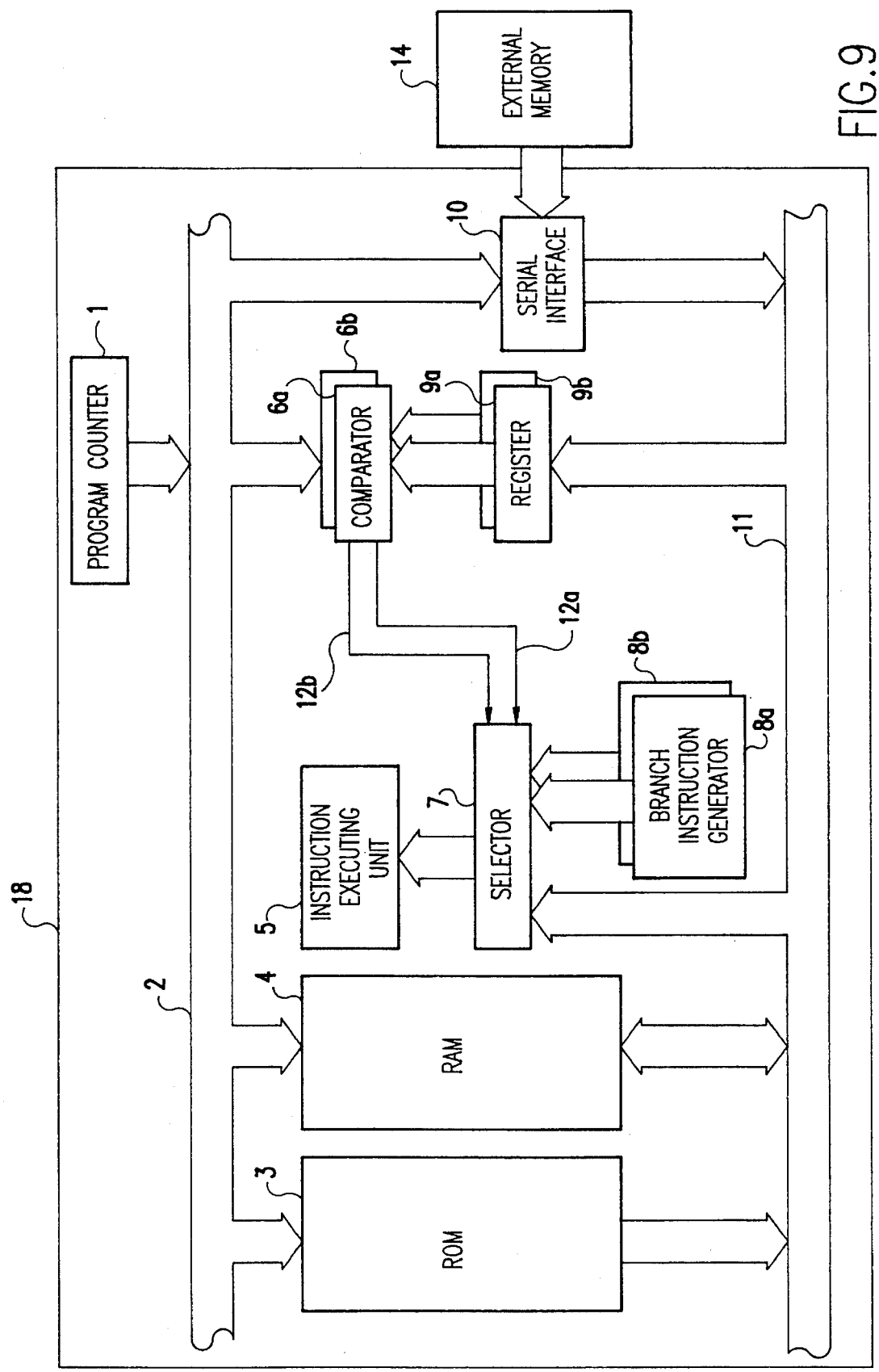
FIG. 9 is a block diagram of a microcomputer according to a fourth embodiment of the present invention.

Fourth Embodiment:

FIG. 9 shows a microcomputer 19 according to a fourth embodiment of the present invention. As shown in FIG. 9, the microcomputer 19 has two comparators 6a, 6b, two registers 9a, 9b, and two branch instruction generators 8a, 8b. Other details of the microcomputer 19 are essentially the same as those of the microcomputer 13 according to the first embodiment.

The comparators 6a, 6b compare the contents of the registers 9a, 9b with the contents of the program counter 1. If the compared data agree with each other, then the comparators 6a, 6b output high-level detected address signals 12a, 12b, respectively. If the compared data do not agree with each other, then the comparators 6a, 6b output low-level detected address signals 12a, 12b, respectively. When the selection signal 12a is high, a selector 7a selects an output signal from the branch instruction generator 8a and outputs it to the instruction executing unit 5. When the selection signal 12b is high, the selector 7a selects an output signal from the branch instruction generator 8b and outputs it to the instruction executing unit 5. When both the selection signals 12a, 12b are low, the selector 7a selects data on the data bus 11, and outputs the selected data to the instruction executing unit 5. At this time, the branch instruction generator 8a generates an instruction code of an absolute branch instruction "BR !F7FDH", and the branch instruction generator 8b generates an instruction code of an absolute branch instruction "BR !F7FAH".

The microcomputer 19 operates in substantially the same manner as the microcomputer 18 according to the third embodiment. However, when the contents of register 9a and the program counter 1 agree with each other, the instruction executing unit 5 executes the absolute branch instruction "BR !F7FDH" and branches off to the address F7FDH in the RAM 4, and when the contents of register 9b and the program counter 1 agree with each other, the instruction executing unit 5 executes the absolute branch instruction "BR !F7FAH" and branches off to the address F7FAH in the RAM 4. In the fourth embodiment, the microcomputer 19 can set the addresses of two bugs and also branch off to different addresses depending on the two bugs. Therefore, if the two bugs are each to be corrected in a different fashion, corrected programs can be arranged more easily than possible with the third embodiment.

The microcomputers according to the third and fourth embodiments can correct two program bugs. Similarly, a microcomputer according to the present invention may be arranged to correct three or more program bugs, and may have a plurality of enable flags corresponding to a plurality of comparators. For example, if a microcomputer is arranged to correct four program bugs and there are three bugs to be corrected, then there is one comparator which is not used, and such a comparator may be made invalid by an enable flag for thereby preventing the microcomputer from operating in error.

While preferred embodiments of the invention have been described in specific terms, this description is for illustrative purposes only, and it is to be understood that changes and variations may be made without departing from the spirit or scope of the following claims.

What is claimed is:

1. A microcomputer comprising:

instruction executing means for decoding and executing instructions;

a program memory for storing a program;

a program counter for successively indicating addresses in said program memory and making said program memory output stored contents;

interface means for obtaining data from an external source;

memory means for storing particular address information obtained from the external source through said interface means;

comparing means for comparing contents of said memory means with contents of said program counter, and outputting a selection signal when the compared contents agree with each other;

branch instruction generating means for generating a branch instruction which can be executed by said instruction executing means to change the execution address of the program stored in said program memory; and selecting means for selecting and supplying said branch instruction to said instruction executing means when said selection signal is true, and selecting and supplying contents of said program memory to said instruction executing means when said selection signal is false;

said instruction executing means comprising means operable according to the program stored in said program memory for obtaining said particular address information from the external source through said interface means, storing said particular address information in said memory means, and executing said branch instruction to execute a program, which starts from an address different from said particular address information and which is stored in said program memory, when said selection signal is true.

2. A microcomputer according to claim 1, further comprising an enable flag for determining whether the selection signal outputted from said comparing means is to be made valid or invalid.

3. A microcomputer according to claim 2, wherein said instruction executing means comprises means for obtaining information to control said enable flag from the external source through said interface means, and making said enable flag true or false depending on the obtained information.

4. A microcomputer comprising:

instruction executing means for decoding and executing instructions;

a program memory for storing a program;

a program counter for successively indicating addresses in said program memory and making said program memory output stored contents;

interface means for obtaining data from an external source;

a plurality of memory means for storing a plurality of items of particular address information obtained from the external source through said interface means;

one or a plurality of comparing means for comparing contents of said memory means with contents of said program counter, and outputting one or a plurality of detected address signals when the compared contents agree with each other;

one or a plurality of branch instruction generating means for generating one or a plurality of branch instructions which can be executed by said instruction executing means to change the execution address of the program stored in said program memory;

logic means responsive to said one or plurality of detected address signals for outputting one or a plurality of selection signals; and selecting means for selecting and supplying any of said branch instructions to said instruction executing means when any of said detected address signal is true, and selecting and supplying contents of said program memory to said instruction executing means when all said detected address signals are false;

said instruction executing means comprising means operable according to the program stored in said program memory for obtaining said particular address information from the external source through said interface means, storing said particular address information in said memory means, and executing said branch instruction to execute a program, which starts from an address different from said particular address information and which is stored in said program memory, when said detected address signal is true.

5. A microcomputer according to claim 4, further comprising one or a plurality of enable flags for determining whether the detected address signals outputted from said comparing means are to be made valid or invalid.

6. A microcomputer according to claim 5, wherein said instruction executing means comprises means for obtaining information to control said enable flags from the external source through said interface means, and making said enable flags true or false depending on the obtained information.

7. A microcomputer comprising:

instruction executing means for decoding and executing instructions;

a program memory for storing a program;

a program counter for successively indicating addresses in said program memory and making said program memory output stored contents;

interface means for obtaining data from an external source;

memory means for storing particular address information obtained from the external source through said interface means;

comparing means for comparing contents of said memory means with contents of said program counter, and outputting a selection signal when the compared contents agree with each other;

branch instruction generating means for generating a branch instruction which can be executed by said instruction executing means to change the execution address of the program stored in said program memory; and selecting means for selecting and supplying said branch instruction to said instruction executing means when said selection signal is true, and selecting and supplying contents of said program memory to said instruction executing means when said selection signal is false;

said program memory comprising, in part or whole, a random-access memory;

said branch instruction comprising a branch instruction to branch off to a predetermined address in the random-access memory of said program memory;

said instruction executing means comprising means operable according to the program stored in said program memory for obtaining said particular address information from the external source through said interface means, storing said particular address information in said memory means, obtaining a particular program from the external source through said interface means, storing said particular program in an area starting with said predetermined address in said program memory, and executing said branch instruction to execute said particular program, which starts from said predetermined address and which is stored in said program memory, when said selection signal is true.

8. A microcomputer according to claim 7, further comprising one or a plurality of enable flags for determining whether the selection signal outputted from said comparing means is to be made valid or invalid.

9. A microcomputer according to claim 8, wherein said instruction executing means comprises means for obtaining information to control said enable flag from the external source through said interface means, and making said enable flag true or false depending on the obtained information.

10. A microcomputer comprising:

instruction executing means for decoding and executing instructions;

a program memory for storing a program;

a program counter for successively indicating addresses in said program memory and making said program memory output stored contents;

interface means for obtaining data from an external source;

a plurality of memory means for storing a plurality of items of particular address information obtained from the external source through said interface means;

one or a plurality of comparing means for comparing contents of said memory means with contents of said program counter, and outputting one or a plurality of detected address signals when the compared contents agree with each other;

one or a plurality of branch instruction generating means for generating one or a plurality of branch instructions, which can be executed by said instruction executing means, to change the execution address of the program stored in said program memory;

logic means responsive to said one or plurality of detected address signals for outputting one or a plurality of selection signals; and selecting means for selecting and supplying any of said branch instructions to said instruction executing means when any of said detected address signal is true, and selecting and supplying contents of said program memory to said instruction executing means when all said detected address signals are false;

said program memory comprising, in part or whole, a random-access memory;

said branch instruction comprising a branch instruction to branch off to a predetermined address in the random-access memory of said program memory;

said instruction executing means comprising means operable according to the program stored in said program memory for obtaining said particular address information from the external source through said interface means, storing said particular address information in said memory means, obtaining a particular program from the external source through said interface means, storing said particular program in an area starting with said predetermined address in said program memory, and executing said branch instruction to execute said particular program, which starts from said predetermined address and which is stored in said program memory, when said detected address signal is true.

11. A microcomputer according to claim 10, further comprising one or a plurality of enable flags for determining whether the detected address signals outputted from said comparing means are to be made valid or invalid.

12. A microcomputer according to claim 11, wherein said instruction executing means comprises means for obtaining information to control said enable flags from the external source through said interface means, and making said enable flags true or false depending on the obtained information.

* * * * *